(12) United States Patent
Deferme et al.

(10) Patent No.: US 12,305,770 B2
(45) Date of Patent: May 20, 2025

(54) COIL ASSEMBLY FOR AN ACTIVELY CONTROLLED DAMPING VALVE ASSEMBLY OF A VEHICLE

(71) Applicant: DRIV AUTOMOTIVE INC., Northville, MI (US)

(72) Inventors: Stefan Deferme, Sint-Truiden (BE); Oskar Rombo, Jönköping (SE); Simon Tingåker, Jönköping (SE)

(73) Assignee: DRIV Automotive Inc., Northville, MI (US)

( * ) Notice: Subject to any disclaimer, the term of this patent is extended or adjusted under 35 U.S.C. 154(b) by 71 days.

(21) Appl. No.: 18/290,161

(22) PCT Filed: May 19, 2022

(86) PCT No.: PCT/EP2022/063610
§ 371 (c)(1),
(2) Date: Nov. 10, 2023

(87) PCT Pub. No.: WO2022/243451
PCT Pub. Date: Nov. 24, 2022

(65) Prior Publication Data
US 2024/0353020 A1    Oct. 24, 2024

(30) Foreign Application Priority Data

May 21, 2021   (EP) .................................... 21175185
Nov. 26, 2021  (SE) .................................... 2151438-5

(51) Int. Cl.
*F16K 31/06*     (2006.01)
*F16F 9/32*      (2006.01)

(52) U.S. Cl.
CPC ........ *F16K 31/0675* (2013.01); *F16F 9/3271* (2013.01); *F16F 2226/04* (2013.01); *F16F 2230/0041* (2013.01)

(58) Field of Classification Search
USPC ..................................................... 251/129.15
See application file for complete search history.

(56) References Cited

U.S. PATENT DOCUMENTS

| | | | |
|---|---|---|---|
| 4,725,041 A * | 2/1988 | Chauvin | ............ F02M 51/0632 239/585.4 |
| 5,409,088 A | 4/1995 | Sonsterod | |

(Continued)

FOREIGN PATENT DOCUMENTS

| | | |
|---|---|---|
| DE | 4310341 C1 | 8/1994 |
| JP | 2015148268 A | 8/2015 |

OTHER PUBLICATIONS

International Search Report and Written Opinion of the ISA issued in PCT/EP2022/063610, mailed Oct. 27, 2022; ISA/EP.

*Primary Examiner* — Matthew W Jellett
(74) *Attorney, Agent, or Firm* — Harness, Dickey & Pierce, P.L.C.

(57) ABSTRACT

The present disclosure relates to a coil assembly for an actively controlled damping valve assembly of a vehicle, comprising: a mating surface for mating with an inner surface of a cavity of a valve housing of the damping valve assembly, and a fixation member configured for axially and rotationally locking the coil assembly with said valve housing, wherein the fixation member is adapted with an outer surface of substantially circular geometry comprising two or more protuberances circumferentially spaced apart and defining press-fit interference points with the inner surface of the cavity such that the coil assembly is axially and rotationally lockable to the valve housing irrespective whether the coil assembly is inserted into the valve housing in a first axial rotational orientation or an at least second axial rotational orientation relative the valve housing different from the first axial rotational orientation. An actively controlled damping valve assembly or a vehicle and a (Continued)

method of mounting the coil assembly in such damping valve assembly is also disclosed.

15 Claims, 7 Drawing Sheets

(56) References Cited

U.S. PATENT DOCUMENTS

| | | | | |
|---|---|---|---|---|
| 5,467,851 | A * | 11/1995 | Handke | F16F 9/465 |
| | | | | 267/179 |
| 5,518,089 | A | 5/1996 | Handke et al. | |
| 5,651,433 | A * | 7/1997 | Wirth | F16F 9/325 |
| | | | | 188/266.6 |
| 6,000,508 | A * | 12/1999 | Forster | F16F 9/46 |
| | | | | 188/299.1 |
| 10,139,006 | B2 * | 11/2018 | Muraoka | H01F 7/126 |
| 10,151,399 | B2 * | 12/2018 | Muraoka | F16H 61/0251 |
| 2004/0113730 | A1 | 6/2004 | Watanabe et al. | |
| 2008/0190719 | A1 | 8/2008 | Jee | |
| 2012/0305349 | A1 | 12/2012 | Murakami et al. | |
| 2013/0341140 | A1 | 12/2013 | Nakajima | |
| 2017/0058988 | A1 | 3/2017 | Manger et al. | |
| 2018/0094692 | A1 | 4/2018 | Hase et al. | |
| 2023/0282405 | A1 * | 9/2023 | Kobayashi | F16F 9/516 |
| | | | | 188/281 |

\* cited by examiner

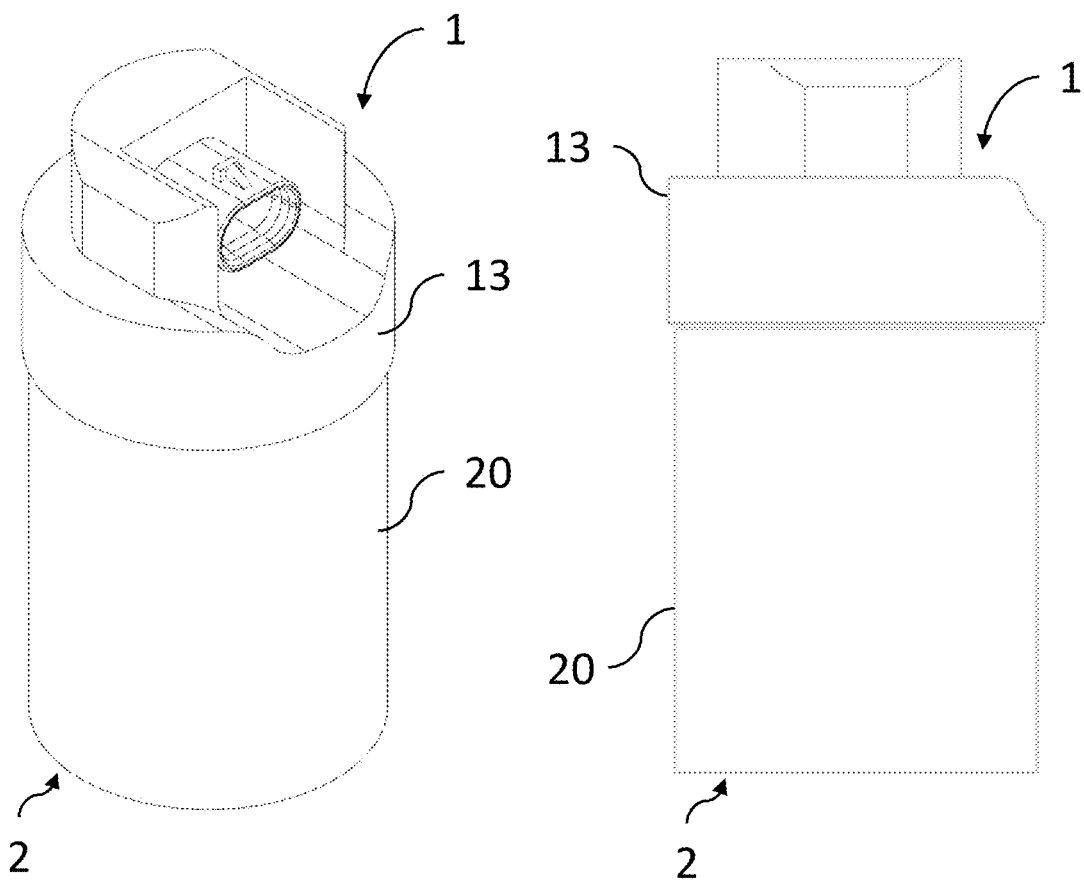
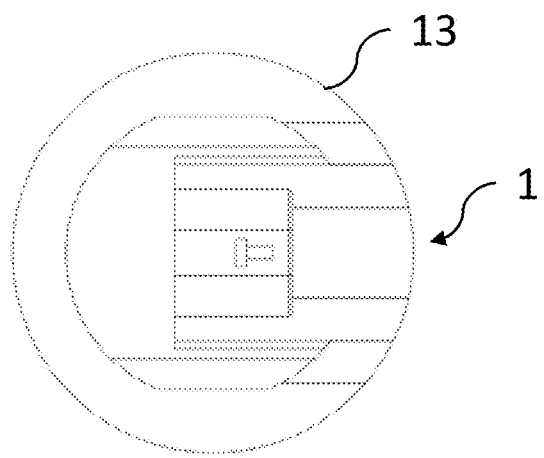

COIL ASSEMBLY FOR AN ACTIVELY CONTROLLED DAMPING VALVE ASSEMBLY OF A VEHICLE

CROSS-REFERENCE TO RELATED APPLICATIONS

This application is a U.S. National Phase Application under 35 U.S.C. 371 of International Application No. PCT/EP2022/063610, filed on May 19, 2022, which claims the benefit of European Patent Application No. 21175185.4, filed on May 21, 2021, and Swedish Patent Application No. 2151438-5, filed on Nov. 26, 2021. The entire disclosures of the aforementioned European and Swedish patent applications are incorporated herein by reference.

TECHNICAL FIELD

The present disclosure to a coil assembly for an actively controlled damping valve of a vehicle, and more particularly a coil assembly providing a press-fit interface. The present disclosure also relates to a an actively controlled damping valve assembly comprising said coil assembly and a method of mounting said coil assembly into a cavity of a valve housing for an actively controlled damping valve.

BACKGROUND

When assembling a coil assembly to a valve housing of an actively controlled valve, it is conventionally fixated by means of a fixation means such as a circlip. Although this solution allows for adequate fixation, it also presents a notably high risk that the circlip is damaged during the assembly. Further, it is difficult to verify whether the circlip is attaching properly or not since it is obscured from inspection after assembly. This leads to high failure rates during assembly and requires manual control and additional cost.

Moreover, when the coil assembly is correctly fixated in the valve housing, the circlip needs to be combined with axial preload force for fixating the coil assembly, often with a large variation in force level. This may in some cases allow the coil assembly to start vibrating and generating noise.

It is therefore of interest to improve upon this conventional way of fixating a coil assembly to a valve housing.

SUMMARY

It is an object of the present invention to provide an improved solution that alleviates the mentioned drawbacks with present solutions. In particular, a first object is to provide a coil assembly that is easy to fixate in a cavity of a valve housing of a damping valve assembly. A second object is to provide a coil assembly by which the failure rate during assembly is reduced. A third object is to provide a coil assembly which facilitates manual control of correct assembly. A further object is to provide a coil assembly that reduces magnetic leakage from the solenoid of the coil assembly during use. The first, second and third objects are at least solved by the invention as defined by the independent claim and further solved by the invention as defined in the dependent claims.

According to a first aspect of the invention, a coil assembly for an actively controlled damping valve assembly of a vehicle is provided. The coil assembly comprises: a mating surface for mating with an inner surface of a cavity of a valve housing of the damping valve assembly; a fixation member configured for axially and rotationally locking the coil assembly with said valve housing, wherein the fixation member is adapted with an outer surface of substantially circular geometry comprising two or more protuberances circumferentially spaced apart and defining press-fit interference points with the inner surface of the cavity such that the coil assembly is axially and rotationally lockable to the valve housing irrespective whether the coil assembly is inserted into the valve housing in a first axial rotational orientation or an at least second axial rotational orientation relative the valve housing different from the first axial rotational orientation.

The two or more protuberances enables the coil assembly to be locked both axially and rotationally to the valve housing. Said locking occurs consequently as the coil assembly is inserted into the valve housing. The present coil assembly thereby is characterized by an easy mounting and fixation process-thus solving the first object of the invention. This is also further improved upon due to the coil assembly not being limited to being fixated in a single particular axial rotational orientation. Rather, there is a certain degree of freedom with respect to axial rotational orientation when mounting and fixating the coil assembly to the valve housing. Further, no circlip is required to lock the coil assembly in place as in some conventional solutions. Thus, there is no risk that a circlip is damaged or erroneous placed during assembly. The present coil assembly thereby reduces failure rate during assembly, thus solving the second object. Moreover, the lack of a circlip also means that manual control of assembly is also facilitated as it can be mostly determined from the exterior. Thus, the third object of the invention is also solved by the present invention.

The fixation member is adapted in shape and size so that the inner surface against which the at least two protuberances interact with must deform while pushing against said at least two protuberances such that press-fit interference points are defined. Since the at least two protuberances are circumferentially spaced apart from each other, the press-fit interference points end up being spaced apart from one another. This allows for the coil assembly to be both rotationally and axially locked with the valve housing. The coil assembly is thus fixated to the valve housing when simply inserting it into the valve housing. Thus, no circlip is required to fixate the coil assembly to the valve housing.

By actively controlled damping valve assembly, it may be meant a damping valve assembly adapted with means for adjusting the damping force in an automatic manner. Preferably, said means for adjusting the damping force is a coil assembly as herein disclosed. By adjusting the current running through the coil of the coil assembly, the magnetic field strength and direction inside the coil may be adjusted so that a plunger placed within said coil is moveable in a controlled manner. The position of the plunger may throttle the damping fluid in the damping valve assembly so that particular damping force characteristics are achieved. The position of the plunger may adjust a pilot pressure associated with a pilot valve.

By vehicle, it may be meant e.g. a four-wheeled vehicle or a two-wheeled vehicle. It may mean an automobile. It may mean a bicycle or a motorcycle. It may mean a motocross-typed motorcycle.

By mating, it may be meant that an object A is adapted in shape and size to geometrically fit with an object B. For instance, object A may define a cylindric surface and object B may define a cylindric surface also with similar curvature but scaled differently in size with respect to object A. Moreover, by mating, it may mean that object A and object B directly engage with each other or that a gap is provided at least partially between objects A and B.

Hence, the mating surface is adapted to fit together with the inner surface of a cavity of the valve housing in such a manner that they are in contact at least partially or such that a gap is formed at least partially between the mating surface and the inner surface.

The mating surface may be a cylindric surface. The inner surface of the cavity of the valve housing may be a cylindric surface. The mating surface may be defined by a body enclosing the coil member of the coil assembly. The body enclosing the coil member may be tube-shaped, thus defining a space extending along an axis of the body in which a plunger may be allowed to move under influence of magnetic field generated by a current flowing through the coil member.

According to one embodiment, the protuberances are circumferentially equally spaced apart. In the case of only two protuberances, these are then arranged along opposite sides of the outer surface of the fixation member. By this, the coil assembly may benefit for increased stability both radially and axially.

According to one embodiment, the coil assembly comprises three protuberances. By having three protuberances, the coil assembly may in particular benefit from increased rotational and axial stability. This particular configuration may also counteract axial tilting.

According to one embodiment, at least one of said protuberances comprises a curved outer surface defining a press-fit interference surface with the inner surface of the cavity. By this, a larger contact surface with the inner surface of the valve housing may be realized. This may allow for a more durable solution as forces acting on components in the arrangement will be less concentrated.

According to one embodiment, at least two of said protuberances comprises a curved outer surface defining a press-fit interference surface with the inner surface of the cavity wherein said at least two curved outer surfaces have the same radius of curvature.

According to one embodiment, said curved outer surface or at least one of said curved outer surfaces extends about 10-50 degrees in a circumferential direction of the fixation member. said curved outer surface or at least one of said curved outer surfaces extends about 10-20 degrees, 20-30 degrees, 30-40 degrees, 40-50 degrees, in a circumferential direction of the fixation member.

According to one embodiment, the coil assembly is adapted to be insertable into the valve housing irrespective of its axial rotational orientation. This allows for even greater degree of freedom in terms of axial rotational orientation when inserting the coil assembly in a valve housing.

According to one embodiment, the fixation member is made of a material comprising metal, preferably metal which is magnetically conductive. Non-limiting examples include metals such as iron, aluminum, nickel, cobalt. The fixation member may be made of a material comprising any such material or a combination thereof.

According to one embodiment, the fixation member is adapted in shape, size and material for closing a magnetic circuit of the coil assembly. By closing the magnetic circuit, i.e. sealing the magnetic field generated by a current flowing through the coil member, magnetic field leakage may be prevented. Moreover, this may also reduce magnetic scatter.

According to one embodiment, the fixation member comprises a disc shape and is coaxially arranged in the coil assembly. According to one embodiment, the fixation member is an integrated member of the coil assembly.

According to a second aspect of the invention, an actively controlled damping valve assembly for a vehicle is provided. The damping valve assembly comprises: a valve housing defining a cavity; an actively controlled damping valve adapted to be arranged into said valve housing, and the coil assembly according to the first aspect of the invention or any embodiments thereof, wherein the valve housing is configured to elastically deform by the radial force of the two or more protuberances of the coil assembly, thereby rotationally and axially locking the coil assembly with said valve housing.

By vehicle, it may mean a four-wheeled vehicle or a two-wheeled vehicle. It may mean an automobile. It may mean a bicycle or a motorcycle. It may mean a motocross-typed motorcycle.

According to a third aspect of the invention, a method for mounting a coil assembly according to the first aspect of the invention or any embodiments thereof into a cavity of a valve housing for an actively controlled damping valve is provided. The method comprises the steps of: inserting the coil assembly into the cavity so that the mating surface of the coil assembly mates with the inner surface of the cavity of the valve housing, and deforming the valve housing wall with the two or more protuberances circumferentially spaced apart, and axially and rotationally locking the coil assembly to said valve housing thereby fixating by press-fit interference points with an inner surface of the cavity at the two or more protuberances of the coil assembly, wherein the step of inserting the coil assembly into the cavity of the valve housing involves inserting the coil assembly in either a first axial rotational orientation or an at least second axial rotational orientation different from the first axial rotational orientation.

According to one embodiment, the coil assembly is adapted to be insertable into the valve housing irrespective of its axial rotational orientation. This allows for increased degree of freedom in terms of mounting the coil assembly into the valve housing, thus no particular axial rotational orientation is required.

According to one embodiment, the valve housing is deformable by means of the two or more protuberances such that the force ratio of the axial force to the radial force, exerted at each press-fit interference point, is about 0.4-0.8. The ratio may be 0.4-0.5, 0.5-0.6, 0.6-0.7, 0.7-0.8.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein:

FIGS. 1A-1C show a coil assembly according to one embodiment of the invention when inserted into a cavity of a valve housing of an actively controlled damping valve assembly;

DESCRIPTION OF EMBODIMENTS

Figure 2A:
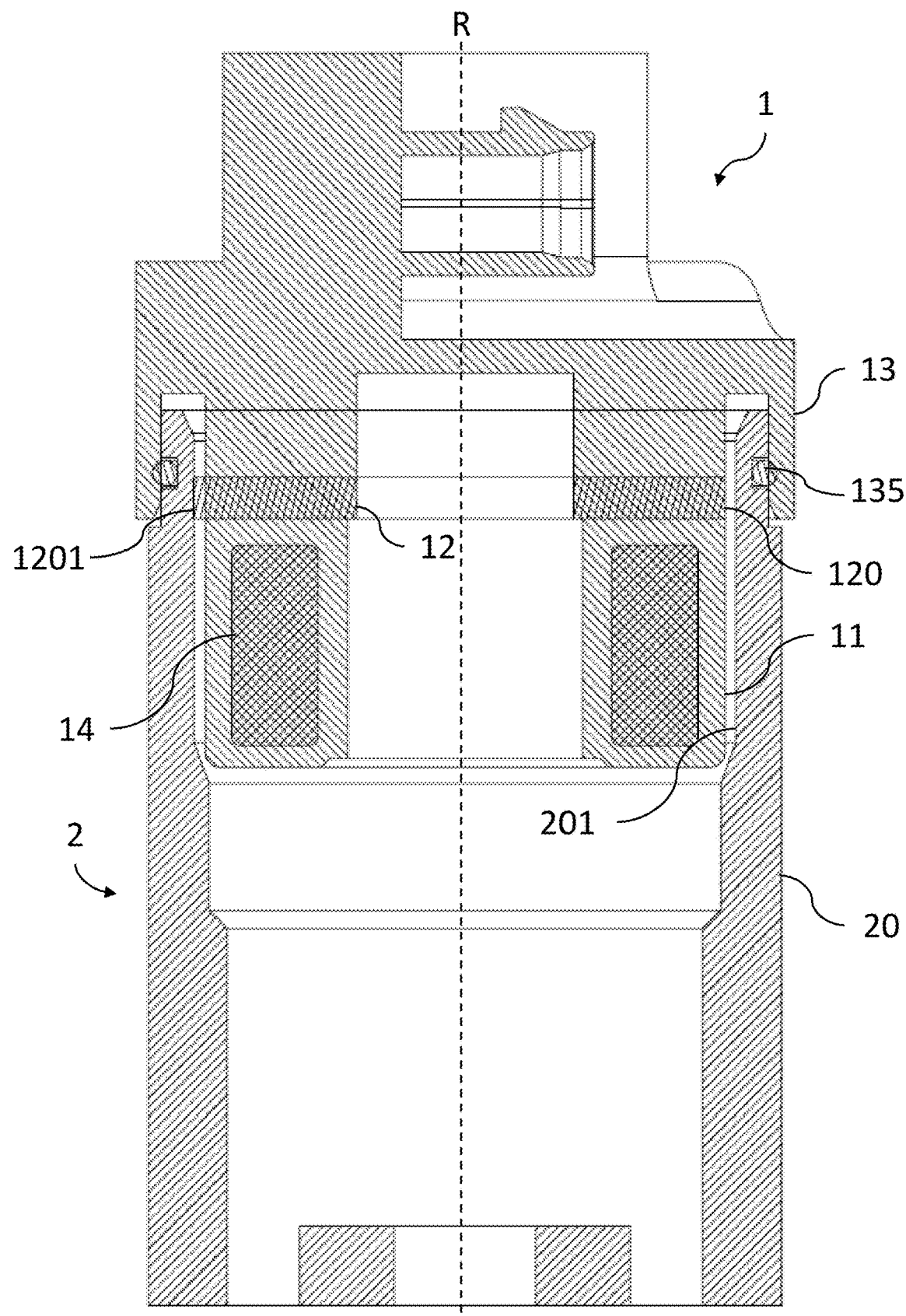
FIG. 2a-2b shows a cross sectional side view of the coil assembly when inserted into a cavity of a valve housing of an actively controlled damping valve assembly.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

FIGS. 1A-1C show a coil assembly 1 according to one embodiment of the invention when inserted into a cavity of a valve housing 20 of an actively controlled damping valve assembly 2. In particular, FIG. 1A shows a perspective view of said arrangement 1, 2. FIG. 1B shows a side view of said arrangement 1, 2. FIG. 1C shows a top view of said arrangement 1, 2. As can be seen in these figures, the valve housing 20 illustrated has a substantially cylindric shape. The coil assembly 1 is adapted to be inserted into an end opening of said valve housing 20 and adapted to being fixated rotationally and axially by means of a fixation member (not shown in FIGS. 1A-1C). Although the figures depict the valve housing 20 and coil assembly 1 as having generally cylindric shapes, the valve housing 20 and coil assembly 1 is not limited to such shapes only. In other embodiments, the housing and coil may have other shapes such as polygonal or oval.

FIG. 2 shows a cross sectional side view of the coil assembly 1 when inserted into a cavity of a valve housing 20 of an actively controlled damping valve assembly 2. The coil assembly 1 is further depicted alone, without the valve housing in FIGS. 3A-3C. FIG. 3A depicts a perspective view, FIG. 3B a side view and FIG. 3C a cross-sectional sideview.

Figure 2B:
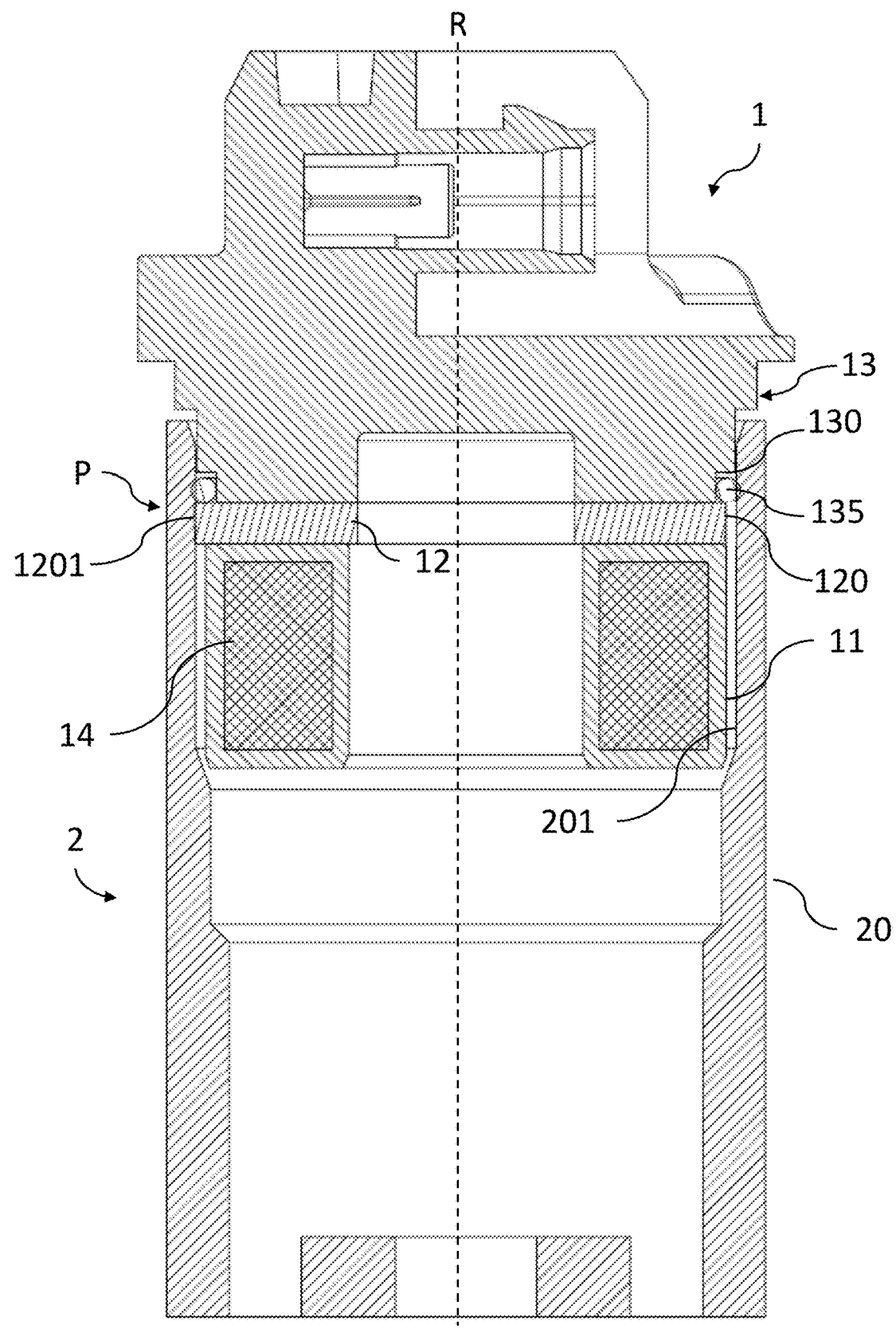
Figure 3A:
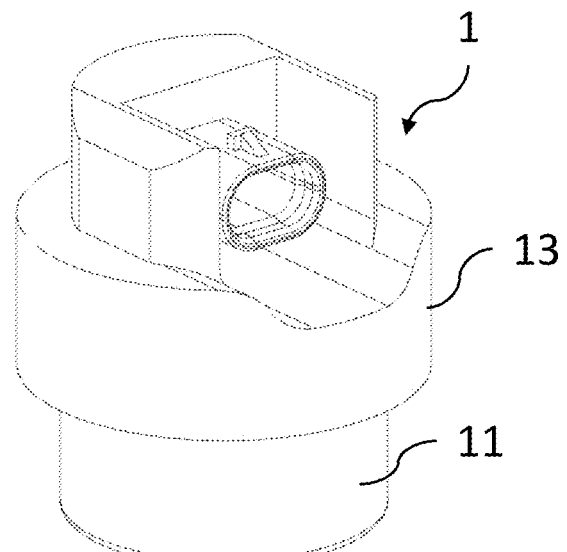
FIGS. 3A-3C show the coil assembly according to one embodiment of the invention.
Figure 3B:
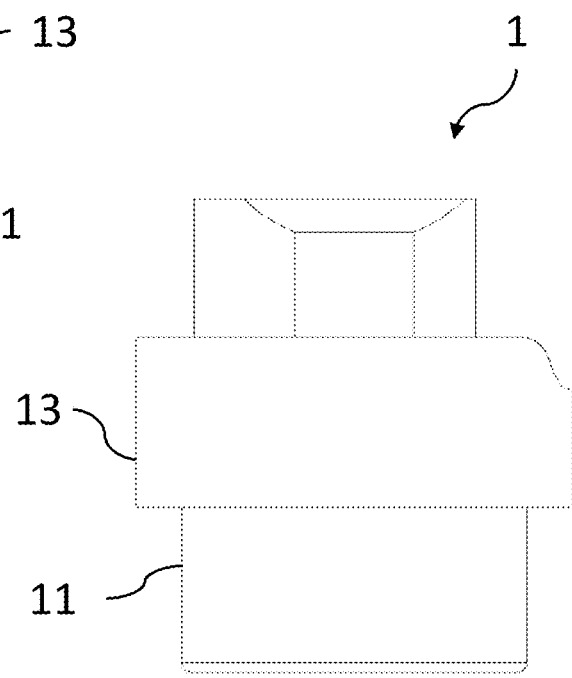
Figure 3C:
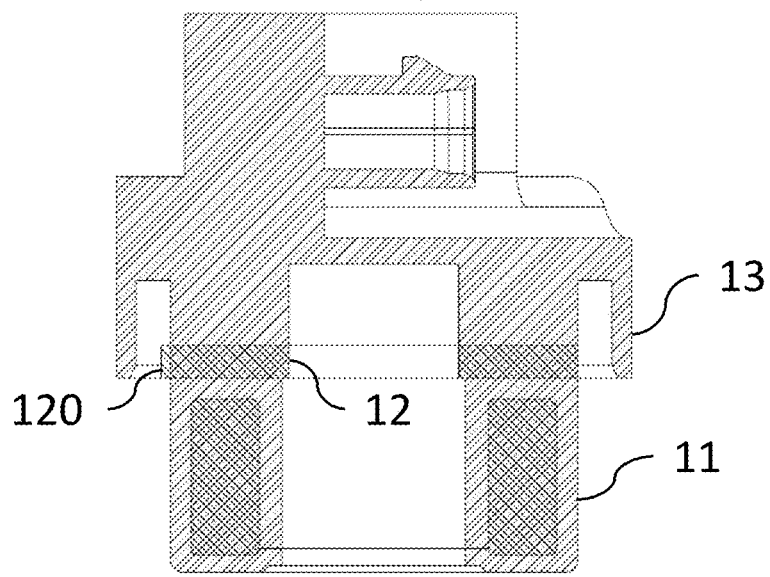

As shown in FIGS. 2a-3C, the coil assembly 1 generally extends along an axis R. The coil assembly 1 comprises a coil member 14. As seen in FIG. 2, the coil member 14 is in the depicted embodiment symmetrically arranged about the axis R. The coil assembly 1 comprises a mating surface 11 for mating with an inner surface 201 of a cavity of the valve housing 20 of the damping valve assembly 2. The mating surface 11 and the inner surface 201 are each formed to fit together and may, as is illustrated, each have a cylindric shape. However, the coil assembly 1 is adapted such that a gap is defined between the mating surface 11 and the inner surface 201 of the valve housing 20. The coil assembly 1 may be adapted so that a predetermined gap is present or such that substantially no gap is present at all between the mating surface 11 and the inner surface 201. The mating surface is defined by a body 11 enclosing the coil 14. The body 11 comprises a tube shape with a center hole defining a space for a plunger to move axially along axis R under influence of magnetic force generated by the coil member 14.

The coil assembly 1 further comprises a fixation member 12 configured for axially and rotationally locking the coil assembly 1 with said valve housing 20. The fixation member 12 is adapted with an outer surface 120 of substantially circular geometry comprising two or more protuberances 1201 circumferentially spaced apart. The two or more protuberances 1201 define press-fit interference points P with the inner surface 201 of the cavity such that the coil assembly 1 is axially and rotationally lockable to the valve housing 20. Moreover, said locking may be irrespective whether the coil assembly 1 is inserted into the valve housing 20 in a first axial rotational orientation or an at least second axial rotational orientation relative the valve housing 20 different from the first axial rotational orientation. The first and second axial rotational orientations represent different axial rotational orientations of the coil assembly 1 about the axis R. The first and second axial rotational orientations are related to each other by means of a rotation of the coil assembly 1 about axis R. Thus, the coil assembly 1 is not limited to being inserted and fixated to the valve housing 20 in a particular orientation. This allows increased degree of freedom when inserting the coil assembly 1 into the valve housing 20. In particular, the coil assembly 1 may in one embodiment be adapted to be insertable into the valve housing 20 irrespective of its axial rotational orientation. The coil assembly 1 may thus be free to being inserted and fixated to the valve housing in any axial rotational orientation. This allows for even greater degree of freedom when inserting the coil assembly 1 into the valve housing 20.

Upon insertion of the coil assembly 1 into the cavity of the valve housing 20, the protuberances 1201 engage with the inner surface 201. As mentioned, these protuberances define press-fit interference points P with the inner surface 201. In the embodiments depicted in the figures, the fixation member 12 is disc shaped wherein the protuberances 1201 extend radially out from an outer surface 120 of the disc. The fixation member 12 further comprises a through-hole. The through-hole is coaxially arranged with the hole of the body enclosing the coil member 14. These form a space which extends along the axis R.

In the illustrated example in FIG. 2a, the fixation member 12 is arranged between the portion of the body enclosing the coil member 14 and an intermediate portion 13 of the coil assembly 1. The intermediate portion 13 may be any portion of the coil assembly 1 that is situated above (as depicted) the fixation member. Above in this context should be interpreted as on an opposite side of the fixation member than the coil member 14. The intermediate portion 13 of the coil assembly has a shape and size which is adapted to mesh with the inner surface 201 of the valve housing. The intermediate portion of may further comprise an aperture 130 for defining a space where a sealing member 135 may be arranged. The sealing member 135 may e.g. be an O-ring or other sealing flexible material. The sealing member 135 may be arranged at any position between the valve housing 20 and the intermediate portion 13 of the of the coil assembly 1. Preferably the sealing is arranged on an outer side of the fixation member 12 so as to protect the fixation member from dirt and moist that may enter from the outer side into the coil assembly. The coil assembly further has electrical connectors in a top portion for being able to e.g. energize the coil.

In an embodiment of FIG. 2b, the fixation member 12 is arranged between the body enclosing the coil member 14 and the body 11 defining an end cap 13 of the coil assembly 1. Also, the sealing member 135 is arranged between the end cap 13 and the valve housing 20.

Figure 4A:
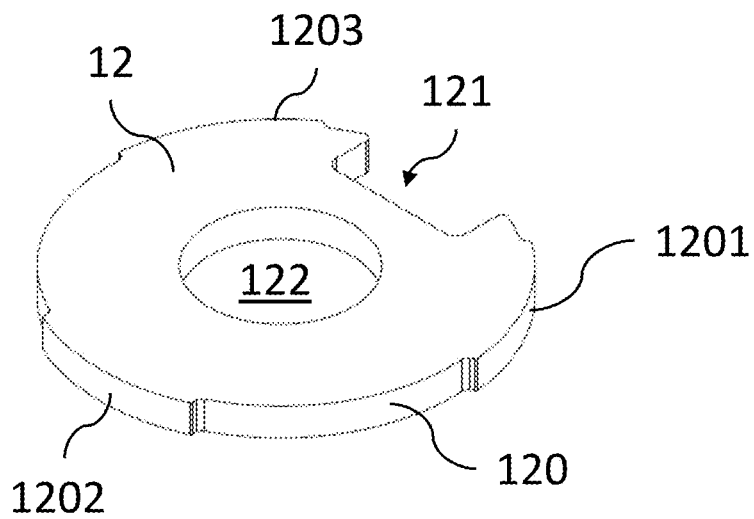
FIGS. 4a-4c shows the fixation member according to one embodiment of the invention.
Figure 4B:
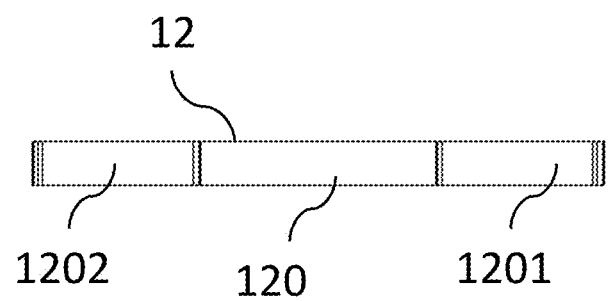
Figure 4C:
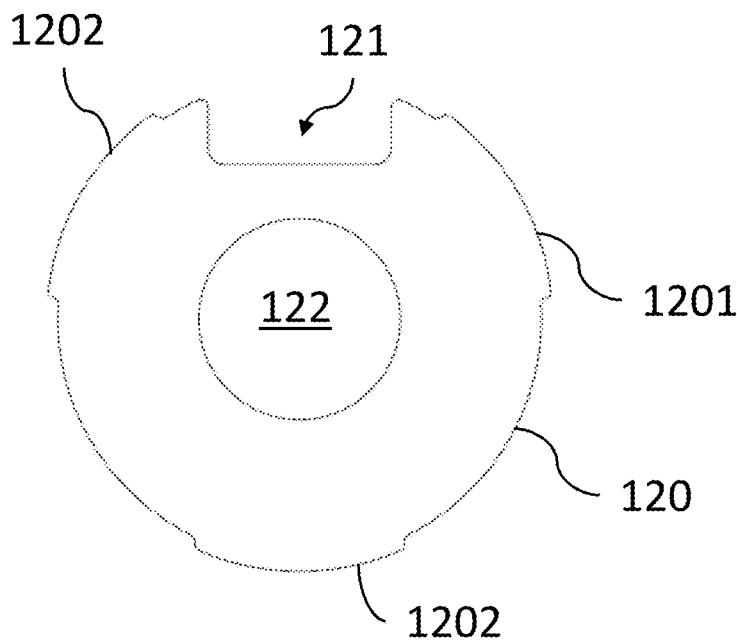

FIGS. 4a-4c shows the fixation member according to one embodiment of the invention. As mentioned, the fixation member 12 is disc shaped and comprises an outer surface 120 of substantially circular geometry. The particular embodiment depicted in FIGS. 4A-4C comprises three protuberances 1201, 1202, 1203 which are circumferentially spaced apart. Moreover, the protuberances 1201, 1202, 1203 each comprise a curved outer surface which define a press-fit interference surface with the inner surface 201 of the cavity rather than just press-fit interference points. Moreover, the curved surfaces of the protuberances 1201, 1202, 1203 have the same radius of curvature. The curved surfaces of the protuberances 1201, 1202, 1203 further extends about 40-50 degrees in a circumferential direction. However, the curved surfaces of the protuberances 1201, 1202, 1203 may extend anywhere between 10-20 degrees, 20-30 degrees, 30-40 degrees, 40-50 degrees or more in a circumferential direction depending on how big press-fit interference surface is desired. Moreover, as mentioned, the fixation member 12 comprises a through-hole 122. The fixation member 12 further comprises a cut-out region 121. The edge adjacent to the cut-out region 121 defines a rectangular.

In a particular embodiment, the fixation member 12 is made of a material comprising metal, preferably a metal which is magnetically conducting. This is advantageous as it allows for closing the magnetic circuit generated by the coil member 14 when a current runs therethrough. This may prevent excessive magnetic field leakage. Moreover, the fixation member 12 may be further adapted in shape, size and material for closing the magnetic circuit of the coil assembly 1.

As stated, the fixation member 12 is arranged between the body 11 enclosing the coil member 14 and an intermediate portion 13 of the coil assembly 1 (FIG. 2*a*) or and end cap (FIG. 2*b*). The fixation member 12 may be an integrated member of the coil assembly 1. In other embodiments, the fixation member may be a separate member that is mountable onto the coil assembly 1.

Figure 5:
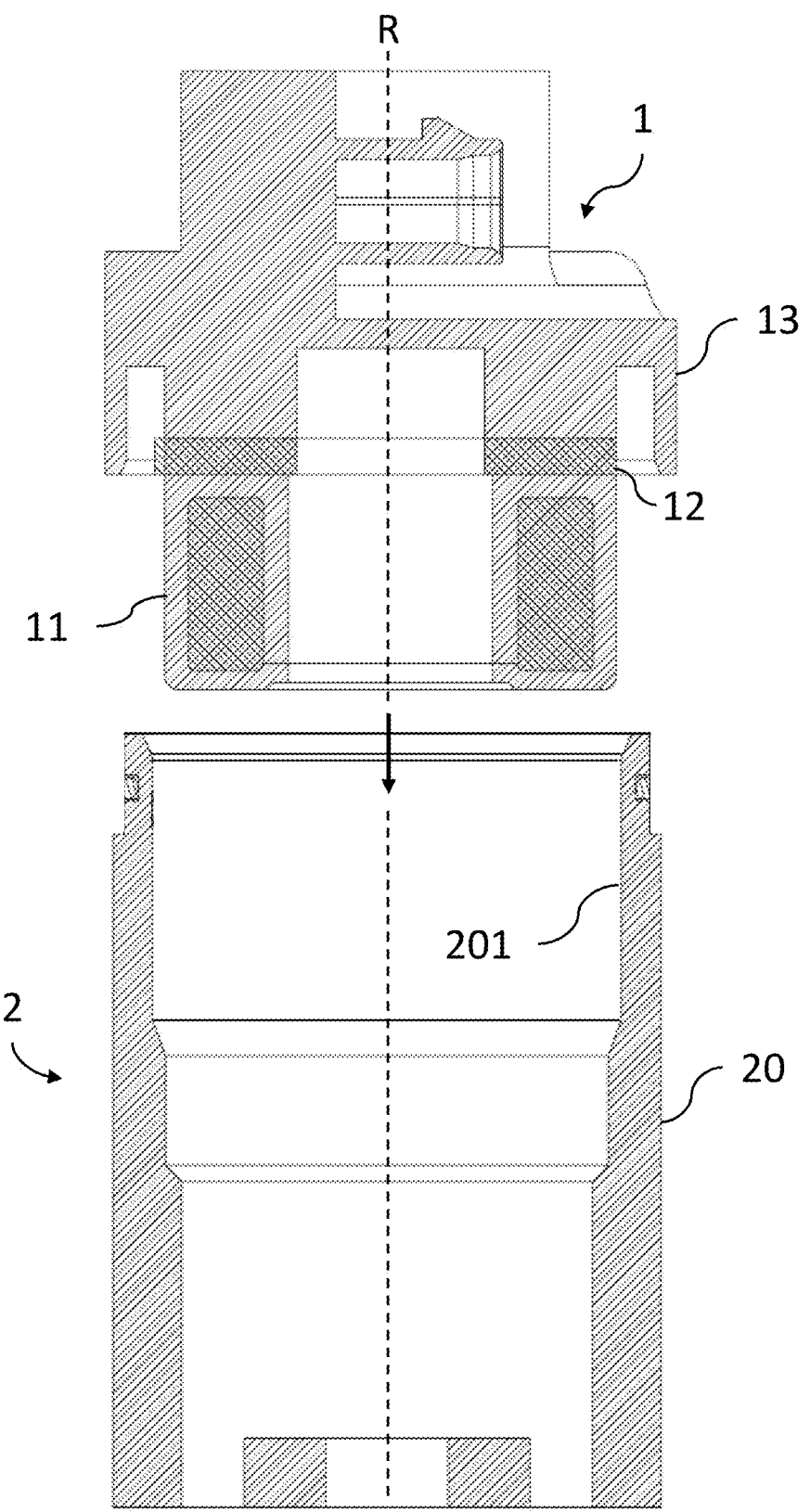
FIG. 5 shows a cross sectional view of the coil assembly as it is being inserted into a cavity of a valve housing of an actively controlled damping valve assembly.

FIG. 5 shows a cross sectional view of the coil assembly 1 as it is being inserted into a cavity of a valve housing 20 of an actively controlled damping valve assembly 2. As the coil assembly 1 is inserted into the cavity of the valve housing 20, the fixation member 12 starts to engage with the inner surface 201 of the valve housing 20 by means of the protuberances 1201, 1202, 1203 (best shown in FIGS. 4*a*-4*c*). When the end cap or intermediate portion 13 of the coil housing 1 is properly seated in a final mounting position relative the valve housing 20, the protuberances 1201, 1202, 1203 radially press onto the inner surface 201. This causes the valve housing 20 to deform, preferably elastically deform. Thus, the coil assembly 1 is held in place by the valve housing 20 pressing on the protuberances 1201, 1202, 1203, thereby defining said press-fit interference points or surfaces. At each press-fit interference point, there is a radial force $F_R$ and an axial force $F_A$ exerted. The force ratio $R_F$ of the axial force $F_A$ to the radial force $F_R$ may be 0.4-0.8. This may further ensure that the coil assembly 1 is held securely in place to the valve housing 20. As an example, nominal axial force FA may be 600-2100 N and the nominal radial force FR may be 1500-5250 N.

As stated, FIGS. 1, 2A-2C, 5 show a part of an actively controlled damping valve assembly 2 for a vehicle, more specifically a portion of the valve housing 20 of the actively controlled damping valve assembly 2. The damping valve assembly comprises the valve housing 20 defining a cavity, an actively controlled damping valve adapted to be arranged into said valve housing 20, and the coil assembly 1 previously detailed. The valve housing 20 is configured to deform, preferably elastically, by the two or more protuberances 1201, 1202, 1203, of the coil assembly 1, thereby rotationally and axially locking the coil assembly 1 with said valve housing 20. The vehicle is preferably an automobile.

Figure 6:
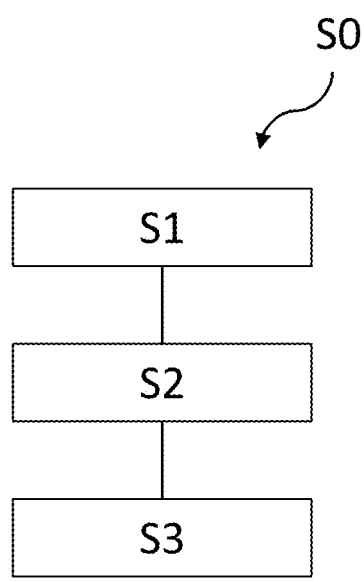
FIG. 6 shows steps of a method according to one embodiment of the invention for mounting a coil assembly into a cavity of a valve housing for an actively controlled damping valve assembly.

FIG. 6 shows steps of a method S0 according to one embodiment of the invention for mounting a coil assembly 1 into a cavity of a valve housing 20 for an actively controlled damping valve assembly 2. The method comprises the steps of inserting S1 the coil assembly 1 into the cavity so that the mating surface 11 of the coil assembly 1 mates with the inner surface 201 of the cavity of the valve housing 20. The method S0 further comprises the step of deforming S2 the valve housing wall with two or more protuberances 1201, 1202, 1203 circumferentially spaced apart. The method S0 further comprises the step of axially and rotationally locking S3 the coil assembly 1 to said valve housing 20 thereby fixating by press-fit interference points with an inner surface of the cavity of the two or more protuberances of the coil assembly 1. The step of inserting S1 the coil assembly 1 into the cavity of the valve housing 20 involves inserting the coil assembly 1 in either a first axial rotational orientation or an at least second axial rotational orientation different from the first axial rotational orientation.

The coil assembly 1 is adapted to be insertable into the valve housing 20 irrespective of its axial rotational orientation.

The valve housing 20 is deformable by means of the two or more protuberances 1201, 1202, 1203 such that the force ratio RF of the axial force FA to the radial force FR exerted at each press-fit interference point is about 0.4-0.8.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A coil assembly for an actively controlled damping valve assembly of a vehicle, comprising:
    a mating surface for mating with an inner surface of a cavity of a valve housing of the damping valve assembly, and
    a fixation member configured for axially and rotationally locking the coil assembly with said valve housing,
    wherein the fixation member is adapted with an outer surface of substantially circular geometry comprising two or more protuberances circumferentially spaced apart and defining press-fit interference points with the inner surface of the cavity such that the coil assembly is axially and rotationally lockable to the valve housing irrespective whether the coil assembly is inserted into the valve housing in a first axial rotational orientation or an at least second axial rotational orientation relative the valve housing different from the first axial rotational orientation.

2. The coil assembly according to claim 1, wherein protuberances are circumferentially equally spaced apart.

3. The coil assembly according to claim 1, comprising three protuberances.

4. The coil assembly according to claim 1, wherein at least one of said protuberances comprises a curved outer surface defining a press-fit interference surface with the inner surface of the cavity.

5. The coil assembly according to claim 1, wherein at least two of said protuberances comprises a curved outer surface defining a press-fit interference surface with the inner surface of the cavity wherein said at least two curved outer surfaces have the same radius of curvature.

6. The coil assembly according to claim 4, wherein said curved outer surface or at least one of said curved outer surfaces extends about 10-50 degrees in a circumferential direction of the fixation member.

7. The coil assembly according to claim 1, wherein the coil assembly is adapted to be insertable into the valve housing irrespective of its axial rotational orientation.

8. The coil assembly according to claim 1, wherein the fixation member is made of a material comprising metal, preferably metal which is magnetically conductive.

9. The coil assembly according to claim 8, wherein the fixation member is adapted in shape, size and material for closing a magnetic circuit of the coil assembly.

10. The coil assembly according to claim 1, wherein the fixation member comprises a disc shape and is coaxially arranged in the coil assembly.

11. The coil assembly according to claim 1, wherein the fixation member is an integrated member of the coil assembly.

12. An actively controlled damping valve assembly for a vehicle, comprising:
    a valve housing defining a cavity,
    an actively controlled damping valve adapted to be arranged into said valve housing, and
    the coil assembly according to claim 1,
    wherein the valve housing is configured to deform, preferably elastically, by the two or more protuberances of the coil assembly, thereby rotationally and axially locking the coil assembly with said valve housing.

13. A method for mounting a coil assembly according to claim 1 into a cavity of a valve housing for an actively controlled damping valve assembly, comprising:
    inserting the coil assembly into the cavity so that the mating surface of the coil assembly mates with the inner surface of the cavity of the valve housing, and
    deforming the valve housing wall with the two or more protuberances circumferentially spaced apart, and
    axially and rotationally locking the coil assembly to said valve housing thereby fixating by press-fit interference points with an inner surface of the cavity at the two or more protuberances of the coil assembly,
    wherein the step of inserting the coil assembly into the cavity of the valve housing involves inserting the coil assembly in either a first axial rotational orientation or an at least second axial rotational orientation different from the first axial rotational orientation.

14. The method according to claim 13, wherein the coil assembly is adapted to be insertable into the valve housing irrespective of its axial rotational orientation.

15. The method according to claim 13, wherein the valve housing is deformable by means of the two or more protuberances such that the force ratio ($R_F$) of the axial force ($F_A$) to the radial force ($F_R$,) exerted at each press-fit interference point, is about 0.4-0.8.

* * * * *